Patented Dec. 22, 1936

2,065,125

UNITED STATES PATENT OFFICE 2,065,125

MANUFACTURE OR TREATMENT OF PRODUCTS OR ARTICLES MADE OF OR CONTAINING CELLULOSE DERIVATIVES OR OTHER LACQUER BASES

Henry Dreyfus, London, England

No Drawing. Application November 21, 1932, Serial No. 643,732. In Great Britain November 30, 1931

1 Claim. (Cl. 18—54)

This invention relates to the manufacture or treatment of products or articles made of or containing cellulose derivatives or other lacquer bases, for example natural or synthetic resins, and is a continuation in part of U. S. applications S. Nos. 629,907 filed 22nd August, 1932, 638,775 filed Oct. 20, 1932, 640,005 filed Oct. 28, 1932 and 640,529 filed Oct. 31, 1932.

I have discovered that 1.3-cyclic diethers, and their substitution derivatives, are very valuable in the production and treatment of products and articles from cellulose derivatives and other lacquer bases, and the present invention relates to the production of liquid and solid compositions containing lacquer bases and 1.3-cyclic diethers, including their substitution derivatives, to the manufacture of articles therefrom, and to the treatment with such diethers of artificial filaments, threads, yarns, ribbons, films and other materials containing cellulose derivatives.

The compounds employed according to the present invention are characterized by the fact that they are cyclic ethers in which two nuclear oxygen atoms are separated by a single carbon atom, and they may thus be referred to as 1:3 cyclic diethers.

The cyclic diethers are of particular value in dissolving or softening cellulose derivatives of relatively high ester or ether content. Thus they have a good solvent power not only for commercial actone-soluble cellulose acetate having an acetyl content of 52–54% calculated as acetic acid, but also for cellulose acetates of higher acetyl content in some cases even up to the theoretical triacetate having a content of 62.5%. Since the available solvents for cellulose acetate, particularly highly esterified cellulose acetate, are limited, this discovery is of particular value.

As is described above, the cyclic diethers employed according to the present invention are characterized by containing the group

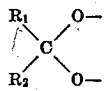

where $R_1$ and $R_2$ may be hydrogen or any substituent group, for example alkyl, aryl, aralkyl or alicyclic groups, and the term "cyclic diether" where used in the specification and claims is to be understood as including both the unsubstituted cyclic diethers and also their substitution products. Examples of compounds which may be employed according to the present invention are 2 methyl 1:3 cyclo trimethylene dioxide

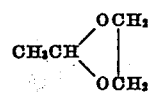

the ethylene glycol diether of acetaldehyde, 2:4 dimethyl 1:3 cyclo trimethylene dioxide

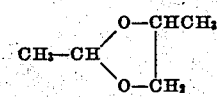

the 1-2 propylene glycol diether of acetaldehyde, 2 methyl-1:3 cyclo tetramethylene dioxide

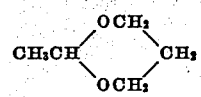

the 1-3-propylene glycol diether of acetaldehyde, and 5:5 dimethyl 1:3 cyclo tetramethylene dioxide

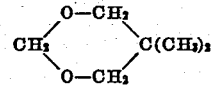

the 2,2-dimethyl 1-3-propylene glycol diether of formaldehyde. Other substances which may be employed according to the present invention are 4-chlor-methyl-1-3-cyclo-trimethylene-dioxide

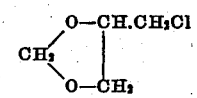

obtainable by refluxing glycerine-mono-chlorhydrin with paraformaldehyde in the presence of concentrated hydrochloric acid, 2:2 diethyl 1:3 cyclo trimethylene dioxide

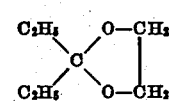

4-methyl-1-3-cyclo-trimethylene-dioxide having the formula

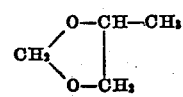

and 2-phenyl-1-3-cyclo-tetramethylene-dioxide

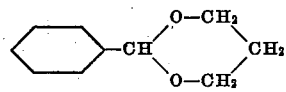

which may be obtained from benzaldehyde and 1-3-propylene glycol. Again, the cyclic diethers may contain aralkyl groups, as for example, 2-benzyl-1-3-cyclo-trimethylene-dioxide

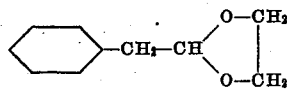

or they may contain alicyclic groupings as for example in the substance having the formula

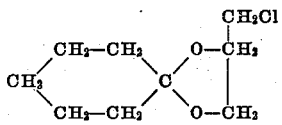

and obtainable by the condensation of cyclohexanone with glycerol-mono-chlorhydrin and the corresponding compounds from cyclo hexanone and glycerine or glycol.

Again, the cyclic ethers may contain other nuclear atoms in addition to the 1:3 oxygen atoms and the carbon atoms, e. g. they may contain other oxygen atoms, as in the compounds obtainable by the condensation of aldehydes, e. g. formaldehyde or a polymer thereof with diethylene glycol or other polyolefine glycols.

The invention is of course in no way limited to the manner of preparation of the compounds which are employed, but it may be mentioned that they may be conveniently prepared by condensing aldehydes or ketones with aliphatic dihydroxy bodies. Etherification catalysts, for example, sulphuric acid, hydrochloric acid, phosphoric acid, ferric chloride, and zinc chloride may be employed.

The invention contemplates quite broadly processes and products utilizing the solvent or softening properties of 1.3-cyclic-diethers for cellulose derivative and other lacquer bases. In general the cyclic tri- and tetra-methylene diethers and their lower alkyl substituted derivatives, which are relatively volatile compounds, are most suitable for the production of solutions, dopes, lacquers and the like, when it is desired that the diether shall form a relatively large proportion, or even the whole, of the solvent, while when the diethers are designed to function as higher boiling constituents in such solutions, or for the production of plastic masses and similar solid or semi-solid compositions, or for the stretching or other treatment of artificial filaments and the like, the diethers containing six, seven or more atoms in the nucleus and aryl, aralkyl or alicyclic derivatives of any of the diethers, which are in general substances of lower volatility, are very suitable.

The cyclic diethers of the present invention are not only solvents and softening agents for cellulose derivatives but they also exert a similar action upon other lacquer bases, for example natural or synthetic or semi-synthetic resins. Among such resins the most important are those obtained by the polymerization of vinyl compounds, for example vinyl acetate or other vinyl compounds which may be regarded as substitution products of polyvinyl alcohol, and which are insoluble in water and soluble in the usual organic solvents. Among other synthetic resins which can be employed for the production of lacquers, varnishes and the like in conjunction with the cyclic diethers of the present invention are the fusible soluble phenol aldehyde resins, the diphenylol propane formaldehyde type of synthetic resin, ketone phenol resins, urea or thiourea formaldehyde resins, aryl sulphonamide aldehyde resins and the so-called alkyl resins obtainable from glycerine or other polyhydric alcohol and phthalic acid or other poly-basic acid or their anhydrides. The natural resins which may be used include all those customarily employed for the manufacture of lacquers and varnishes, and particularly dammar and shellac. The most important lacquer bases for the production of lacquers, dopes, varnishes and the like according to the present invention however, are cellulose acetate or other esters or ethers of cellulose either alone or together with the resins previously mentioned.

The cyclic diethers will not in general be employed alone but in conjunction with other low, medium or high boiling solvents for the lacquer base in the production of lacquers, dopes, varnishes and the like according to the present invention, since it is desirable that such compositions should contain suitably balanced proportions of low, medium and high boiling constituents. The cyclic diethers may fulfill any one or more of these functions, for example a relatively volatile cyclic diether such as 4-methyl-1-3-trimethylene-dioxide may be employed, if desired in conjunction with other volatile solvents such as acetone, in the case of cellulose acetate, or benzene in the case of certain synthetic resins, and other suitable compounds may be employed to furnish the medium and high boiling constituents. Such compounds may be either cyclic diethers or substances of a different chemical nature. In general the compositions will also contain plasticizers and diluents. Preferably organic diluents are employed, since the presence of water in lacquers is in general undesirable. As examples of suitable liquids which may be used in conjunction with the cyclic diethers may be mentioned acetone, methyl acetone, methyl ethyl ketone, methyl acetate, ethyl acetate, ethers, esters and ether-esters of olefine and polyolefine glycols, as for example the mono-methyl and ethyl ethers of ethylene and propylene glycols, ethylene glycol mono-acetate and methyl glycol mono-acetate, dioxane, methylene and ethylene chlorides, dichlorethylene, trichlorethylene, chloroform, methyl, ethyl, isopropyl and other alcohols, benzene, toluene, and other hydrocarbons, ethers, for example isopropyl ether, ethyl lactate, diacetone alcohol and tetrachlor ethane. When very high volatility is required in the lacquers and the like, acetaldehyde, methyl formate, dimethylene dioxide or other very low boiling solvents may be used, together with one or more of the cyclic ethers and with or without other solvents. Among high boiling solvents and plasticizers which may be employed in the lacquers may be mentioned triacetin, diethyl phthalate, dibutyl phthalate, sulphonamides, for example alkylated xylene sulphonamides, sulphonanilides, tartrates, for example dibutyl or di-iso-amyl tartrate, diphenylol propane, triphenyl phosphate, tricresyl phosphate (the last two preferably in conjunction with sulphonamides, tartrates or other highly compatible plasticizers when used to plasticize organic derivatives of cellulose), or other phenolic plasticizers. The compositions may also contain any other desired constituents, for example dystuffs or coloured or white pigments or substances adapted to reduce the flammability, for example halogenated and particularly brominated organic compounds, examples of which are tribromacetanilide and other brominated acidylated aromatic amines.

The above solvents, swelling agents, plasticizers and diluents are mentioned as examples of suitable substances which may be employed in conjunction with the cyclic diethers not only in the production of lacquers, but also generally in the processes described in the present specification.

An important application of the cyclic diethers is the production of spinning solutions containing cellulose derivatives for the manufacture of artificial filaments, threads, yarns, films, foils and the like. The diethers may function in such solutions as low, medium, or high boiling solvents or plasticizers, and one or more ethers may be present fulfilling any one or more of such functions. The solutions may also contain other suitable solvents, swelling agents, plasticizers and diluents, e. g. any of the compounds mentioned above in connection with the production of lacquers. Further the presence of water in certain proportions, e. g. 5–8%, is frequently advantageous in the production of filaments and the like by either dry or wet spinning processes and in the manufacture of films, foils or sheets by wet spinning.

In addition to being employed in the spinning solutions themselves, the cyclic diethers may also be used in conjunction with spinning processes in the coagulating bath and in after treatment baths in order to maintain the products in a relatively plastic state, as is described for example in U. S. applications S. Nos. 402,785 filed 26th October 1929 and 418,414 filed 3rd January, 1930. The compounds employed for these purposes are preferably substances of medium or low volatility, e. g. 2 benzyl 1:3 cyclo trimethylene dioxide.

The cyclic diethers may be employed in the production of plastics and moulding powders as relatively volatile solvents to assist in the incorporation of plasticizing agents and as high boiling or relatively non-volatile constituents designed to remain in the plastic compositions or moulding powders. The compositions may be obtained in any suitable manner, for example by spraying the cellulose derivative or other base with a solution or dispersion containing a cyclic diether as a constituent, followed by working up on malaxating rollers and removal of excess solvent during and/or after working up with or without heat.

A further application of the cyclic diethers is in the treatment of already formed materials made of or containing cellulose derivatives, for example filaments, yarns, threads, ribbons, films and fabrics. Thus the tendency of woven fabrics to slip or of warp or circular knitted fabrics to split or ladder may be reduced or eliminated by treatment with cyclic diethers, e. g. according to the process described in U. S. application S. No. 152,516 filed 3rd December, 1926, a relatively volatile diether being preferably chosen. Again, the pliability or extension of filaments, threads or the like containing cellulose derivatives, particularly the knotting properties of comparatively thick filaments or artificial horsehair, may be improved by treatment with the diethers, the treatment being preferably carried out without tension or under only slight tension, so that shrinkage may take place. Shrinkage of artificial filaments, yarns and the like in order to improve their extension or pliability is particularly important in connection with filaments or the like produced by wet spinning processes or by the stretching of dry spun products, which in some cases have a relatively low extension, and processes for effecting such shrinkages are described in U. S. application S. No. 611,240 filed 13th May, 1932. Again, shrinkage of the materials in order to produce effects may be carried out by means of the cyclic diethers, e. g. according to the process described in U. S. application S. No. 607,667 filed 26th April, 1932.

Improvement of the tensile strength of artificial filaments, threads, yarns and the like containing cellulose acetate or other cellulose derivatives may also be assisted by the cyclic diethers, by processes in which the softening of the materials is assisted or effected by means of such reagents, the materials being simultaneously and/or subsequently subjected to a stretching operation. When cyclic diethers having a high solvent power for the cellulose derivative are employed, it is desirable to dilute them with non-solvents, for example water, benzene, di-isopropyl ether or other diluents in which they are miscible. The diethers may form the sole solvent or softening agent present in the treating medium, or other solvents or softening agents may also if desired be present. Application of the softening agent may take place in any suitable manner, e. g. by spraying or by contacting the materials with wicks or rollers supplied with the agents, or by passing the materials through baths containing them. Again, the materials in hank, bobbin or other suitable form may be soaked in baths containing the cyclic diether. The concentration of the diether will of course depend upon numerous factors, for example the temperature and time of treatment, the type of cellulose derivative and the degree of stretch which it is desired to effect. The softening agents may be removed prior to contact of the materials with the device which applies the stretching force, in which case the force then operates from the washed portion of the filaments to the softened portion. Processes for improving the tensile strength of artificial filaments and the like are described in U. S. Patent No. 1,709,470 and U. S. applications S. Nos. 378,684 filed 16th July 1929 and 573,424 filed 6th November 1931.

For the treatment of filaments, yarns and the like of cellulose derivatives, sizes containing the cyclic diethers may be made up so as to lubricate the yarns or other materials, particularly in order to facilitate textile operations such as winding, winding and twisting, beaming and the like. Such sizes may if desired contain suitable thickening agents, for example water-soluble or dispersible polymerized vinyl compounds or oxidized linseed oil or other drying oils.

The cyclic diethers may also be employed in processes involving the absorption of liquid or solid materials by filaments, yarns, fabrics and the like containing cellulose esters or ethers. Thus the materials may be treated with the diethers either during or before treatments adapted to dye, print, discharge, load, mordant or apply delustering compounds to the materials, such treatments being facilitated or rendered possible by the aid of these compounds. For example a large number of solid agents have little or no affinity for acetone-soluble cellulose acetate, and by means of the cyclic diethers such substances may be incorporated in the materials by dyeing, printing, stencilling or mechanical impregnation methods. Among such substances may be mentioned certain basic dyestuffs having relatively little affinity particularly in printing processes, acid wool and direct cotton dyestuffs, certain vat dyestuffs, white and coloured pigments, for example titanium oxide, and certain discharges such as formaldehyde sulphoxylate discharges. Moreover, the diethers may be employed to relustre fabrics or other materials containing cellulose esters or ethers which have been delustered by the action of moist steam or hot aqueous media, and in this connection reference is made to U. S. Patent No. 1,808,098. Application of the diether may be uniform over the whole of the material so as to obtain a uniform relustring or it may be local so as to produce an effect fabric. Dyestuffs, pigments, discharges or other effect materials may be included in the relustring printing compositions.

In all the above applications of the cyclic diethers to already formed products containing cellulose acetate or other cellulose esters or ethers, the diethers may be applied in conjunction with other solvents, swelling agents or diluents, as for example hydrocarbon diluents of the aliphatic, aromatic and cyclo-aliphatic series, ethers, alcohols, water and the like.

While the manufacture and treatment of materials containing cellulose acetate is more particularly described in this specification, since commercially this derivative is by far the most important, it is to be understood that the invention consists quite broadly in the manufacture and treatment of products from all cellulose derivatives, for example cellulose formate, propionate, butyrate, nitroacetate, or other organic esters of cellulose or mixed esters of cellulose, ethyl, butyl, benzyl or other cellulose ethers and mixed ether-esters, for example ethyl cellulose acetate or oxyethyl cellulose acetate, as well as from cellulose nitrate, synthetic or natural resins or other lacquer bases.

The following examples illustrate the invention, but it is to be clearly understood that they do not limit it in any way:—

*Example 1*

A fabric consisting of acetone-soluble cellulose acetate yarns and either delustred or of normal lustre is printed with the following printing paste:—

|  | Parts |
|---|---|
| Dyestuff or pigment | 1 to 3.5 |
| Diethylene glycol | 5 to 7 |
| Water | 16 |
| 1-3-tetramethylene-dioxide | 25 to 55 |
| Gum arabic 1:1 | 40 to 60 |

The dyestuff or pigment may be a typical cellulose acetate dyestuff, for example a dyestuff of the amino anthraquinone series, or a nitro-diarylamine, or it may be an acid wool or direct cotton dyestuff which normally has little or no affinity for the goods, or again a pigment may be used, for example titanium oxide. The fabric is dried after printing and steamed with dry steam in the usual way, and is then washed with water, soaked for a few minutes at 40–45° C. in a solution containing 2½ grams of soap per litre and is finally rinsed. Where a delustred fabric has been used and the printing paste includes a dyestuff, the lustre of the printed areas is restored.

*Example 2*

Filaments or yarns of acetone-soluble cellulose acetate in hank or other suitable form are soaked for about 2 to 5 minutes in a bath consisting of a 30–40% aqueous solution of 4-chlormethyl-1-3-cyclo-trimethylene-dioxide at ordinary atmospheric temperature, and after the softening treatment they are very gradually stretched to the desired extent, for example by more than 100% of their original length. Stretching may be effected if desired for example to 500 or 700% or more of the original length of the filaments. Stretching is preferably carried out gradually, and by providing a bath of suitable length, the stretching may be applied to travelling filaments, for example filaments travelling in warp formation.

*Example 3*

Filaments or yarns of a cellulose acetate having an acetyl value of 57–58%, calculated as acetic acid, are soaked, as described in the preceding example, for 2–5 minutes in a bath containing 45–50% aqueous 2-4-dimethyl-1-3-cyclo-trimethylene-dioxide, and they are then stretched as described in the above example.

*Example 4*

A 25% solution of acetone soluble cellulose acetate in a solvent consisting of 50% acetone, 5% water and 45% of 2-methyl-1-3-cyclo-trimethylene-dioxide is spun by ordinary dry spinning methods, the temperature in the cell being from 75 to 90° C.

*Example 5*

A 22–25% solution of cellulose acetate in 2:2 dimethyl-1-3-cyclo-trimethylene-dioxide containing from 5 to 10% of water is extruded through spinning nozzles into a coagulating bath consisting of a 50–60% aqueous solution of methyl glycol monoacetate. On emerging from the coagulating bath the soft filaments are carried through a guide to a roller rotating at a peripheral speed sufficient to draw the filaments down to very fine denier. After leaving the feed roller excess solvent is removed, for example by washing with a dilute solution of methyl glycol monoacetate, e. g. a 10–15% solution, or with salt solution, for example a 30% solution of sodium sulphate, and the filaments are finally washed with water and dried.

*Example 6*

A 23 to 25% solution of cellulose acetate in acetone is extruded through spinning nozzles into an aqueous coagulating bath containing about 12–15% of diacetone alcohol and 15–25% of 2:2-dimethyl-1-3-cyclo-tetramethylene-dioxide. Spinning is subsequently carried out as described in the preceding example.

*Example 7*

The following is an example of a lacquer composition:—

|  | Parts |
|---|---|
| Cellulose acetate | 100 |
| Diphenylol propane formaldehyde resin | 30 |
| Dibutyl tartrate | 200 |
| Tricresyl phosphate | 15 |
| 2-dimethyl-1-3-cyclo-trimethylene dioxide | 400 |
| Dioxane | 100 |
| Acetone | 100 |
| Diacetone alcohol | 60 |

Example 8

The following is a further example of a lacquer composition:—

| | Parts |
|---|---|
| Cellulose acetate | 50 |
| Polymerized vinyl acetate | 50 |
| Diphenylol propane | 35 |
| Acetone | 250 |
| 2-phenyl-1-3-cyclo-tetramethylene-dioxide | 50 |
| Alcohol | 250 |
| Benzene | 250 |

Example 9

The following is an example of a lacquer composition containing a vinyl acetate base:—

| | Parts |
|---|---|
| Polymerized vinyl acetate | 100 |
| Diphenylol-propane formaldehyde-resin | 45 |
| Tricresyl phosphate | 65 |
| Alcohol | 900 |
| 2-methyl-1-3-cyclo-trimethylene-dioxide | 100 |

Example 10

The following is an example of the production of a plastic composition containing a cellulose ester and a cyclic diether. 10 parts of tricresyl phosphate together with 25 parts of monomethylated isomeric-xylene sulphonamides are dissolved in a mixture of 40 parts of 2-methyl-1-3-cyclo-tetramethylene-dioxide, 30 parts of benzene and 30 parts of alcohol. The solution is sprayed or otherwise incorporated with about 100 parts of acetone-soluble cellulose acetate and the mass then worked up on malaxating rollers, excess solvent being removed during and/or after evaporation with or without heating. A plastic composition is obtained which may be extruded or rolled into sheets or formed into articles of any desired shape which may then be seasoned as usual.

What I claim and desire to secure by Letters Patent is:—

In the manufacture of filaments, threads, yarns, fabrics and like materials containing cellulose acetate, by a process involving the operation of dissolving or softening said cellulose acetate, the step of effecting said operation with the aid of 5.5-dimethyl-1.3-cyclo-tetramethylene-dioxide.

HENRY DREYFUS.